(12) United States Patent
Egolf et al.

(10) Patent No.: US 8,950,764 B2
(45) Date of Patent: Feb. 10, 2015

(54) JOUNCE BUMPER, END MEMBER, GAS SPRING ASSEMBLY AND METHOD OF ASSEMBLY

(71) Applicants: Stephen R. Egolf, Indianapolis, IN (US); Stephen C. Street, Carmel, IN (US)

(72) Inventors: Stephen R. Egolf, Indianapolis, IN (US); Stephen C. Street, Carmel, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 13/753,493

(22) Filed: Jan. 29, 2013

(65) Prior Publication Data

US 2013/0193664 A1   Aug. 1, 2013

Related U.S. Application Data

(60) Provisional application No. 61/591,947, filed on Jan. 29, 2012.

(51) Int. Cl.
| | |
|---|---|
| *B60G 11/62* | (2006.01) |
| *B60G 11/27* | (2006.01) |
| *F16F 9/04* | (2006.01) |
| *B60G 11/22* | (2006.01) |
| *F16F 1/44* | (2006.01) |
| *F16F 9/05* | (2006.01) |

(52) U.S. Cl.
CPC .................. *B60G 11/62* (2013.01); *B60G 11/22* (2013.01); *F16F 1/44* (2013.01); *F16F 9/052* (2013.01)
USPC .......... 280/124.157; 280/124.162; 267/64.11; 267/64.27

(58) Field of Classification Search
USPC ........... 280/86.75, 86.754, 124.157, 124.162; 267/35, 64.11, 64.19, 64.23, 64.27, 267/292, 293
See application file for complete search history.

(56) References Cited

U.S. PATENT DOCUMENTS

| | | | |
|---|---|---|---|
| 6,682,058 B1 | 1/2004 | Németh et al. | |
| 7,500,659 B2 * | 3/2009 | Levy | 267/64.27 |
| 8,181,945 B2 * | 5/2012 | Miyahara et al. | 267/140.12 |
| 2005/0194726 A1 | 9/2005 | Klatt et al. | |
| 2006/0226586 A1 * | 10/2006 | Levy | 267/64.27 |
| 2008/0093783 A1 * | 4/2008 | Leonard | 267/64.27 |
| 2008/0315474 A1 | 12/2008 | Koeske et al. | |
| 2009/0302514 A1 * | 12/2009 | Grabarz et al. | 267/64.27 |
| 2011/0215551 A1 * | 9/2011 | Galasso et al. | 280/276 |

FOREIGN PATENT DOCUMENTS

| | | |
|---|---|---|
| DE | 33 41 315 A1 | 5/1985 |
| DE | 34 23 602 | 1/1986 |

(Continued)

OTHER PUBLICATIONS

Machine translation of DE 102006057046.*

(Continued)

*Primary Examiner* — Ruth Ilan
*Assistant Examiner* — Barry Gooden, Jr.
(74) *Attorney, Agent, or Firm* — Jason A. Houser; Fay Sharpe LLP

(57) ABSTRACT

A jounce bumper can include a mounting wall and at least one helical thread. An end member can be at least partially formed from a quantity of polymeric material and can include a base wall and at least one helical thread integrally formed from the quantity of polymeric material. The end member and the jounce bumper can form a gas spring assembly. A method of assembly is also included.

20 Claims, 9 Drawing Sheets

(56) References Cited

FOREIGN PATENT DOCUMENTS

| DE | 42 13 676 | 10/1993 |
| DE | 10 2006 057046 B3 | 2/2008 |
| DE | 10 2007 051103 A1 | 3/2009 |
| EP | 0 510 359 | 10/1992 |

OTHER PUBLICATIONS

International Search Report.
Machine translation of DE 34 23 602.
Machine translation of EP 0 510 359.
Machine translation of DE 42 13 676.

* cited by examiner

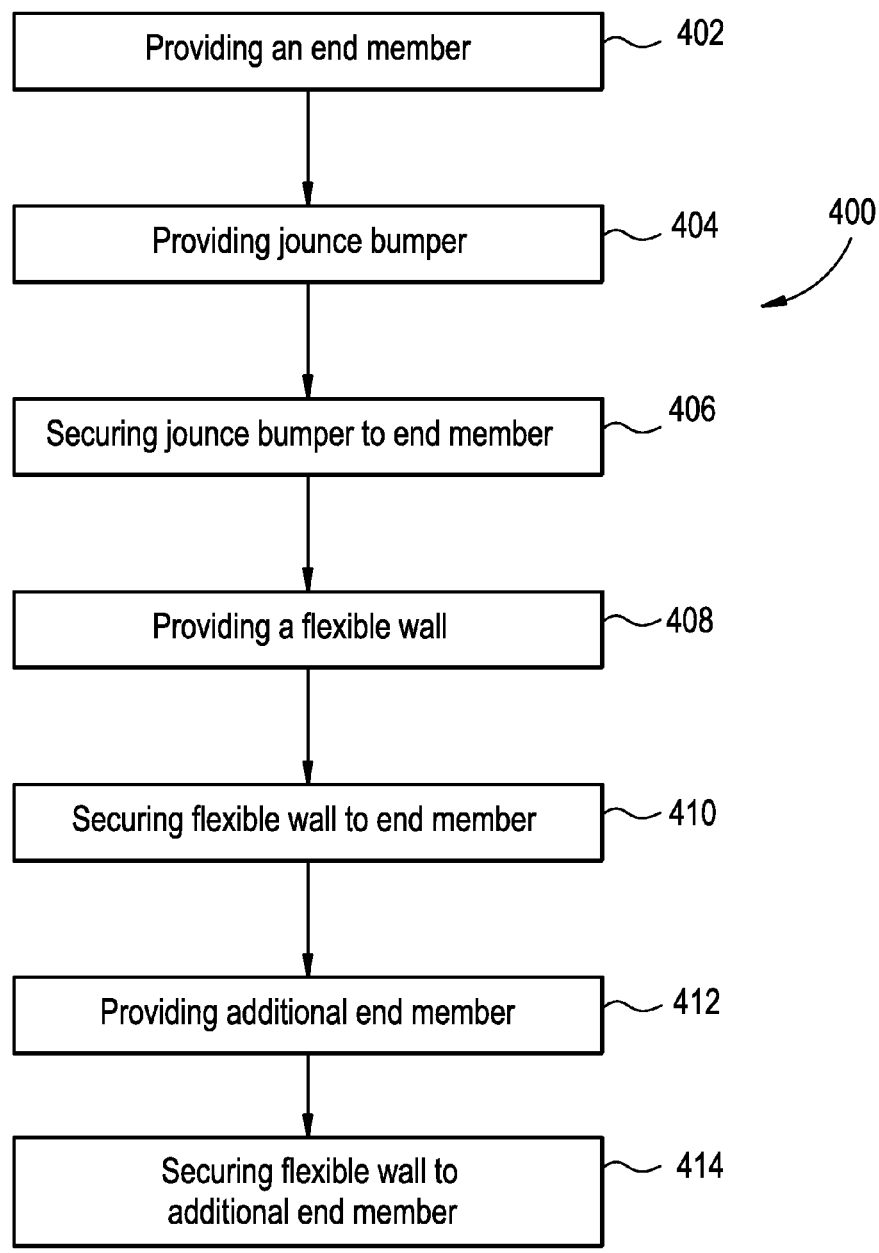

JOUNCE BUMPER, END MEMBER, GAS SPRING ASSEMBLY AND METHOD OF ASSEMBLY

BACKGROUND

The subject matter of the present disclosure broadly relates to the art of gas spring devices and, more particularly, to a jounce bumper and an end member that are configured to threadably engage one another. Such a jounce bumper and an end member can be included in or otherwise form a part of a gas spring assembly, a suspension system, a kit and/or a method of assembly.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Generally, the range of motion of a suspension system extends between a first or fully compressed condition and a second or fully extended condition. To eliminate contact during jounce conditions between opposing portions of the sprung and unsprung masses, contact between opposing portions of components of the suspension system or contact between any combination thereof, jounce bumpers are commonly installed on one or more portions of the vehicle to prevent such opposing portions from directly impacting one another. Thus, during jounce motion of the suspension system, an opposing component will contact the jounce bumper rather than impacting the component on or near which the jounce bumper is mounted.

Jounce bumpers of a variety of types, kinds and configurations have been developed and are commonly used. Additionally, a variety of arrangements and constructions have been developed for gas spring pistons as well as for connection arrangements for securing jounce bumpers and gas spring pistons together. Notwithstanding the wide usage and overall success of such known designs, it is believed to be generally desirable to develop new constructions and/or designs that may advance the art of gas spring devices.

BRIEF SUMMARY

One example of a jounce bumper in accordance with the subject matter of the present disclosure can be at least partially formed from a quantity of polymeric material. The jounce bumper can include a mounting wall and at least one helical thread integrally formed on the jounce bumper from the quantity of polymeric material.

In some cases, a jounce bumper according to the foregoing paragraph can include an interengagement feature, such as a plurality of teeth disposed in spaced relation to one another in a circular or helical pattern.

One example of an end member in accordance with the subject matter of the present disclosure can be at least partially formed from a quantity of polymeric material and can include a base wall and at least one helical thread integrally formed from the quantity of polymeric material.

In some cases, an end member according to the foregoing paragraph can include an interengagement feature, such as a plurality of teeth disposed in spaced relation to one another in a circular or helical pattern.

One example of an end member and jounce bumper assembly in accordance with the subject matter of the present disclosure can include an end member and a jounce bumper that are capable of being threadably interengaged with one another. The end member can be at least partially formed from a quantity of polymeric material and can include at least one helical thread integrally formed from the quantity of polymeric material. The jounce bumper can include a mounting wall and at least one helical thread that is complimentary to the at least one helical thread of the end member. The at least one helical thread of the jounce bumper can be dimensioned to threadably engage the at least one helical thread of the end member such that the mounting wall of the jounce bumper can abuttingly engage the base wall of the end member.

One example of a gas spring assembly in accordance with the subject matter of the present disclosure can include a first end member, a second end member, a flexible wall and a jounce bumper. The second end member can be at least partially formed from a quantity of polymeric material and can include a base wall and at least one helical thread integrally formed from the quantity of polymeric material. The flexible wall can be secured between the first and second end members in a substantially fluid-tight manner such that a spring chamber can be at least partially defined between the first and second end members. The jounce bumper can be disposed within the spring chamber and can be operatively connected to the second end member. The jounce bumper can include a mounting wall at least one helical thread that is complimentary to the at least one helical thread of the end member. The at least one helical thread of the jounce bumper can be dimensioned to threadably engage the at least one helical thread of the end member such that the mounting wall of the jounce bumper can abuttingly engage the base wall of the end member.

One example of a method of assembling a gas spring assembly in accordance with the subject matter of the present disclosure can include providing an end member that is at least partially formed from a quantity of polymeric material and that includes a base wall and at least one helical thread integrally formed from the quantity of polymeric material. The method can also include providing a jounce bumper that includes a mounting wall and at least one helical thread that is complimentary to the at least one helical thread of the end member. The method can further include securing the jounce bumper and the end member to one another by interengaging the at least one helical thread of the end member and the at least one helical thread of the jounce bumper such that the mounting wall of the jounce bumper abuttingly engages the base wall of the end member.

BRIEF DESCRIPTION OF THE DRAWINGS

FIG. 9 is a graphical representation of one example of a method of manufacturing a gas spring assembly in accordance with the subject matter of the present disclosure.

DETAILED DESCRIPTION

Figure 1:
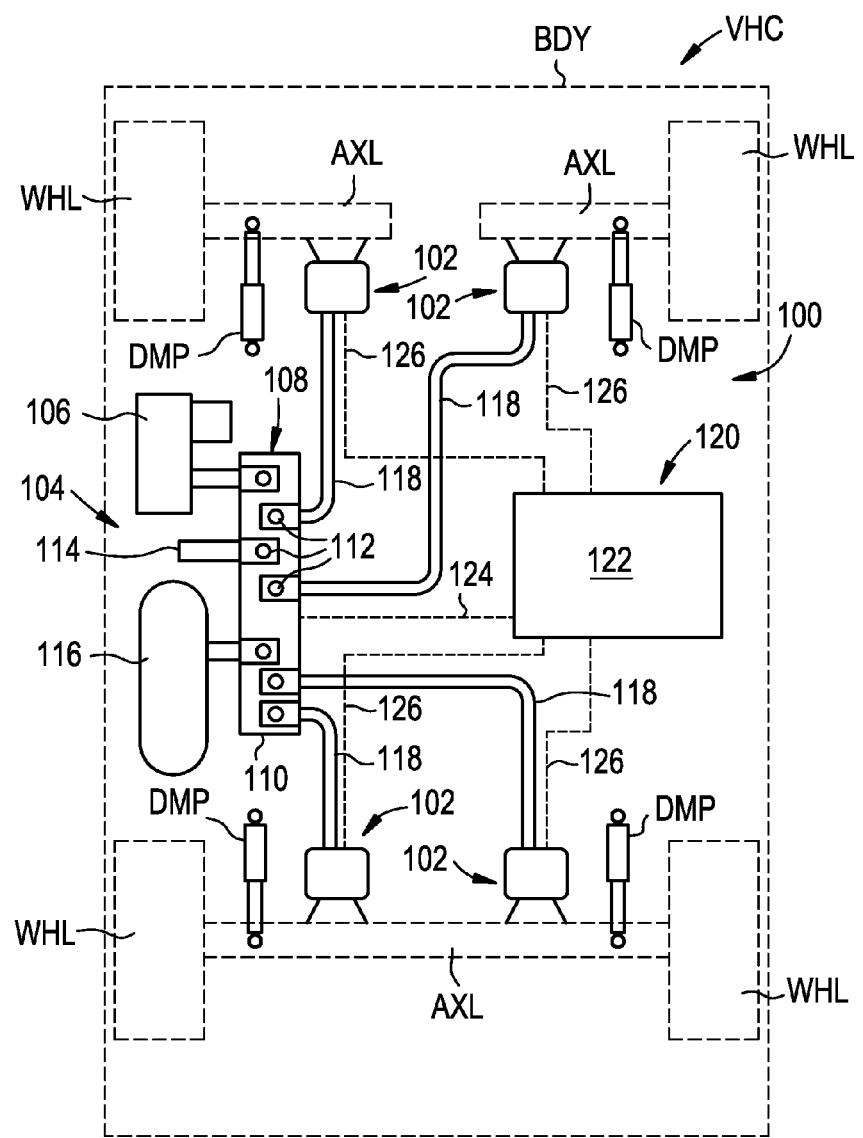
FIG. 1 is a schematic representation of one example of a suspension system of an associated vehicle including one or more gas spring assemblies in accordance with the subject matter of the present disclosure.

Turning now to the drawings, wherein the showings illustrate examples of the subject matter of the present disclosure and which are not to be considered limiting, FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will also be appreciated that such a suspension system of the vehicle can also optionally include a plurality of damping members, such as dampers DMP, for example, and that any such damping members can also be operatively connected between the sprung and unsprung masses of the associated vehicle in any suitable manner.

The suspension system can also include a plurality of gas spring assemblies supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration or arrangement. As shown in FIG. 1, gas spring assemblies 102 are supported between axles AXL and body BDY of associated vehicle VHC. Additionally, it will be recognized that the gas spring assemblies shown and described in FIG. 1 (e.g., gas spring assemblies 102) are illustrated as being of a rolling lobe-type construction. It is to be understood, however, that gas spring assemblies of any other type, kind and/or construction could alternately be used.

Suspension system 100 also includes a pressurized gas system 104 operatively associated with the gas spring assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also optionally include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas.

Valve assembly 108 is in communication with gas spring assemblies 102 through suitable gas transfer lines 118. As such, pressurized gas can be selectively transferred into and/or out of the gas spring assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices (not shown in FIG. 1), such as, for example, may be operatively associated with the gas spring assemblies and capable of outputting or otherwise generating data, signals and/or other communications having a relation to a height of the gas spring assemblies or a distance between other components of the vehicle. Such height sensing devices can be in communication with ECU 122, which can receive the height or distance signals therefrom. The height sensing devices can be in communication with ECU 122 in any suitable manner, such as through conductors or leads 126, for example. Additionally, it will be appreciated that the height sensing devices can be of any suitable type, kind and/or construction.

Figure 2:
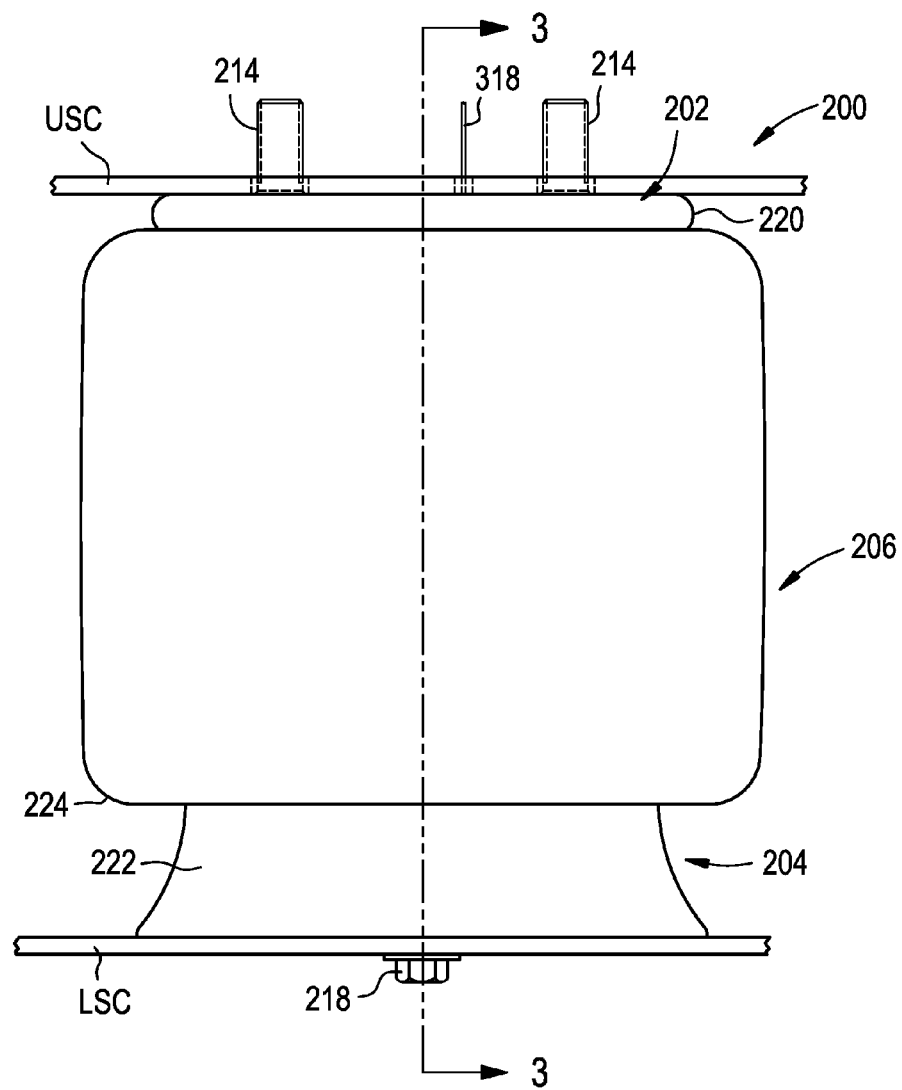
FIG. 2 is a side view of one example of a gas spring assembly in accordance with the subject matter of the present disclosure.
Figure 3:
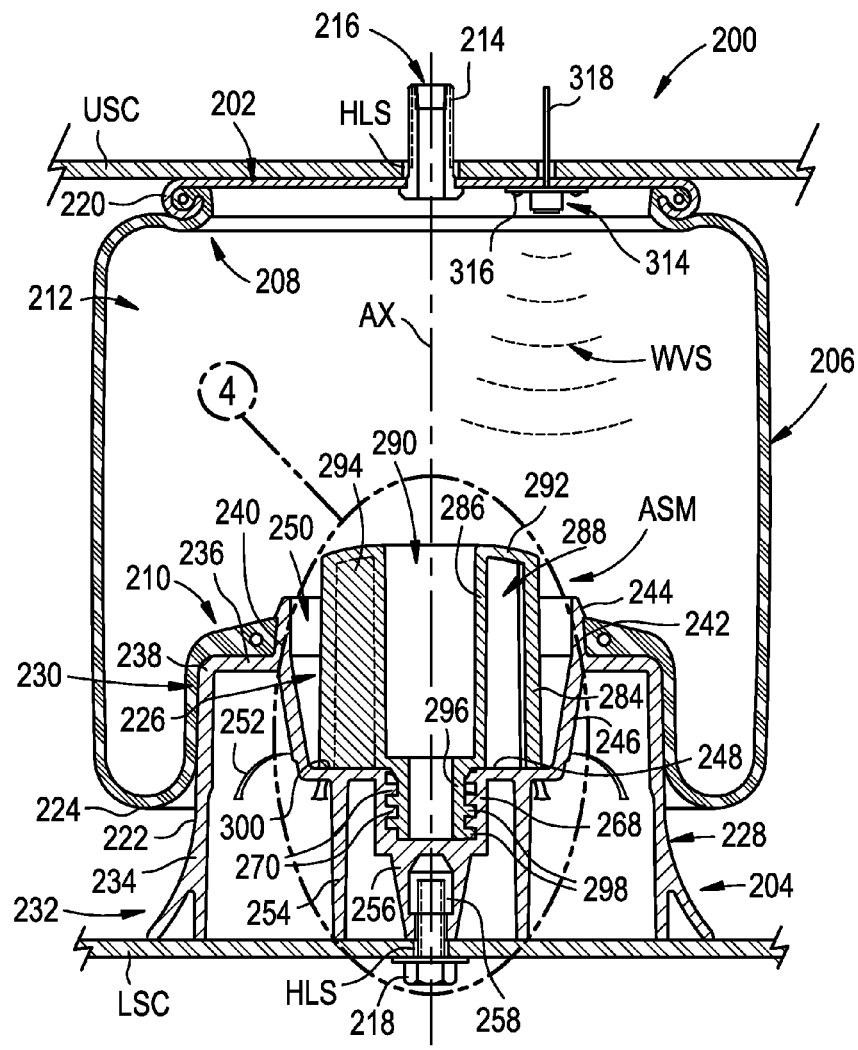
FIG. 3 is a cross-sectional side view of the gas spring assembly in FIG. 2 taken from along line 3-3 therein.
Figure 4:
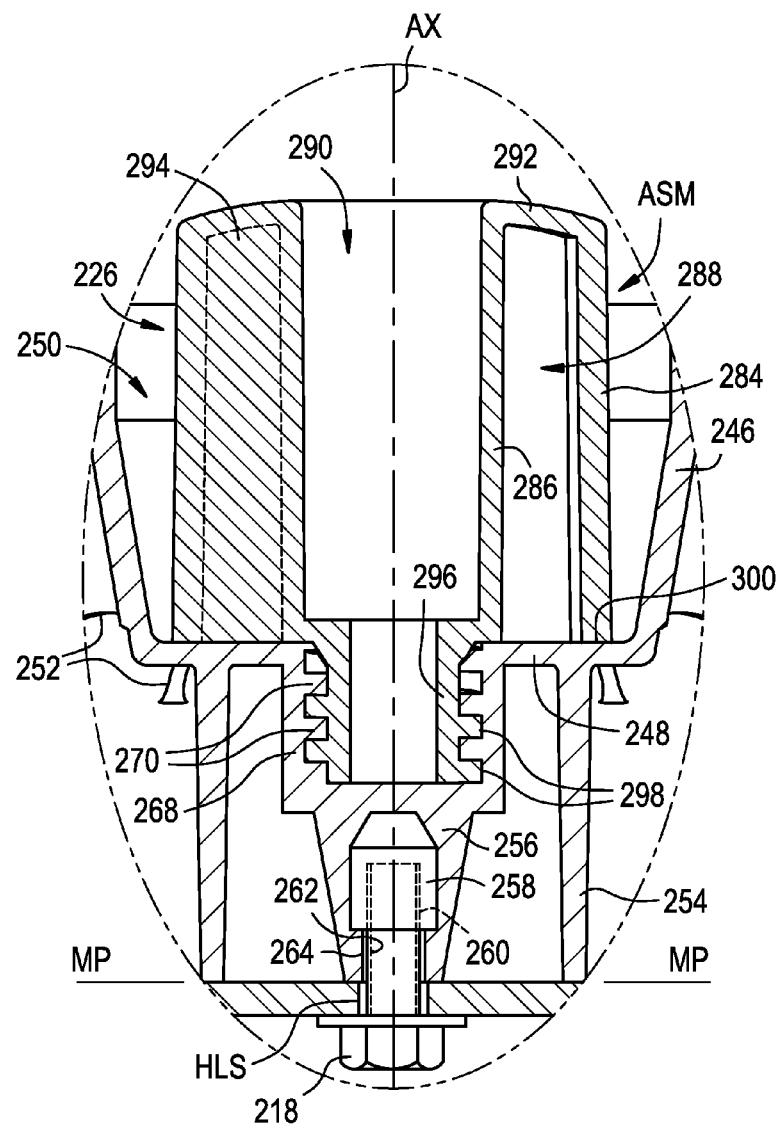
FIG. 4 is an enlarged view of the portion of the gas spring assembly in FIGS. 2 and 3 identified as Detail 4 in FIG. 3.
Figure 5:
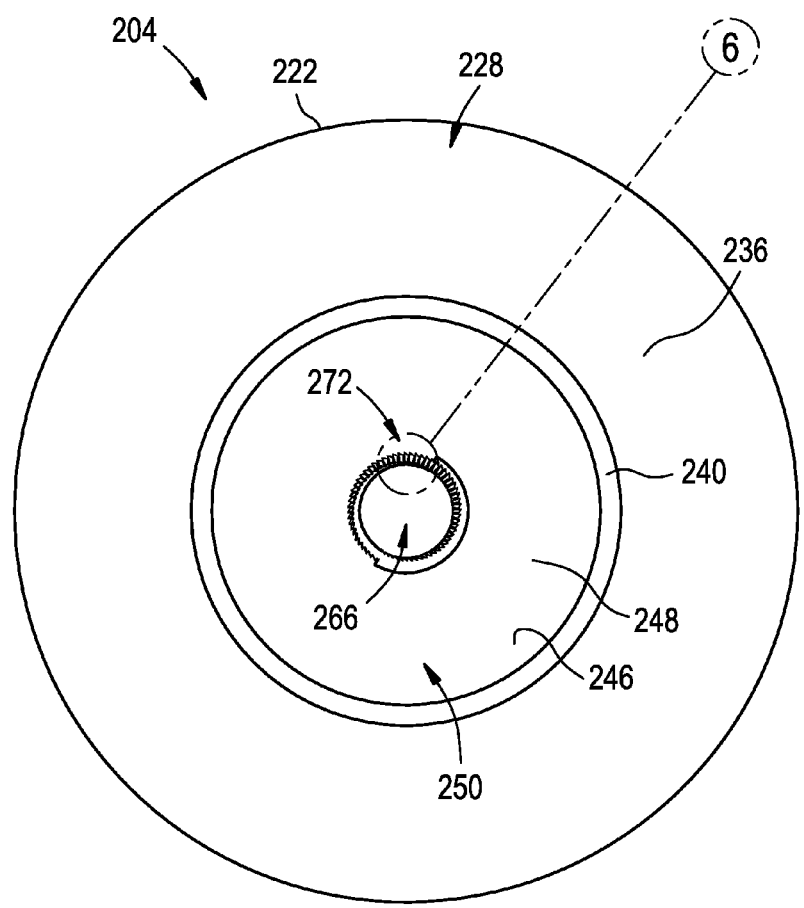
FIG. 5 is a top plan view of the end member shown in FIGS. 2-4.
Figure 6:
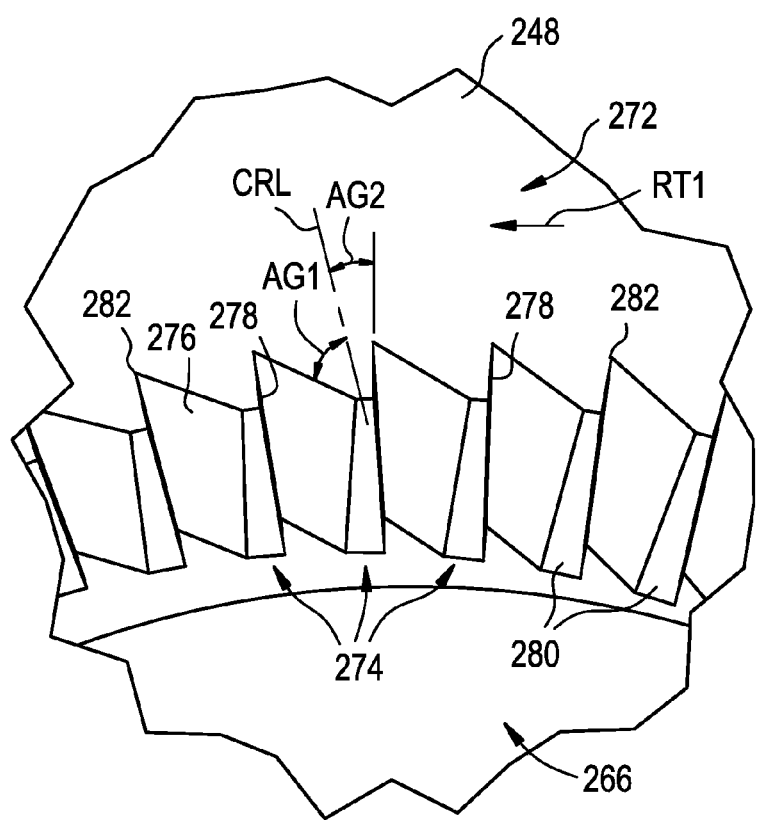
FIG. 6 is a greatly-enlarged view of the portion of the end member in FIGS. 2-5 identified as Detail 6 in FIG. 5.
Figure 7:
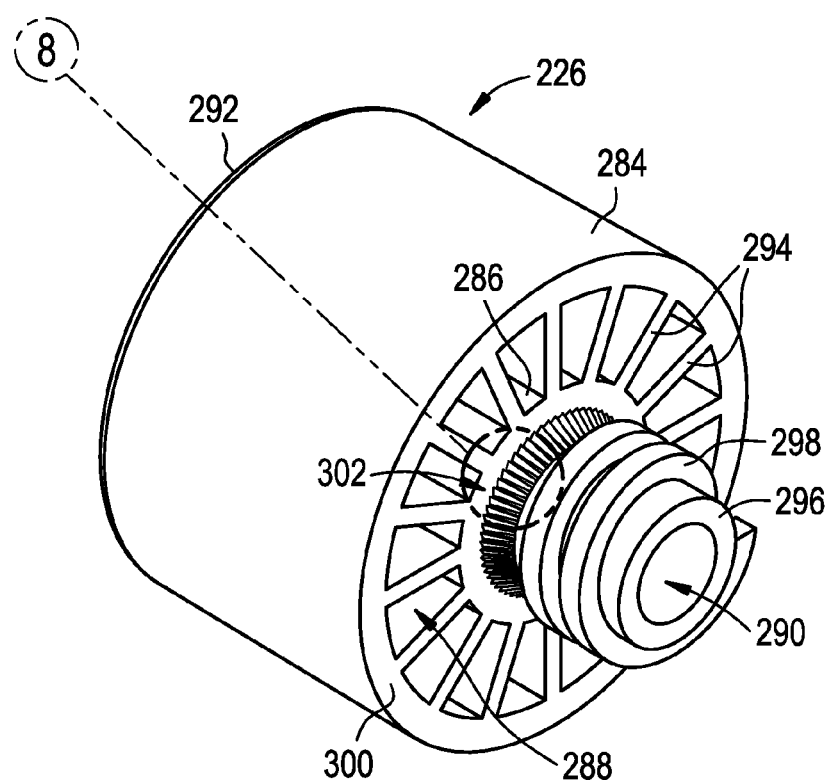
FIG. 7 is a perspective view of the jounce bumper shown in FIGS. 3 and 4.
Figure 8:
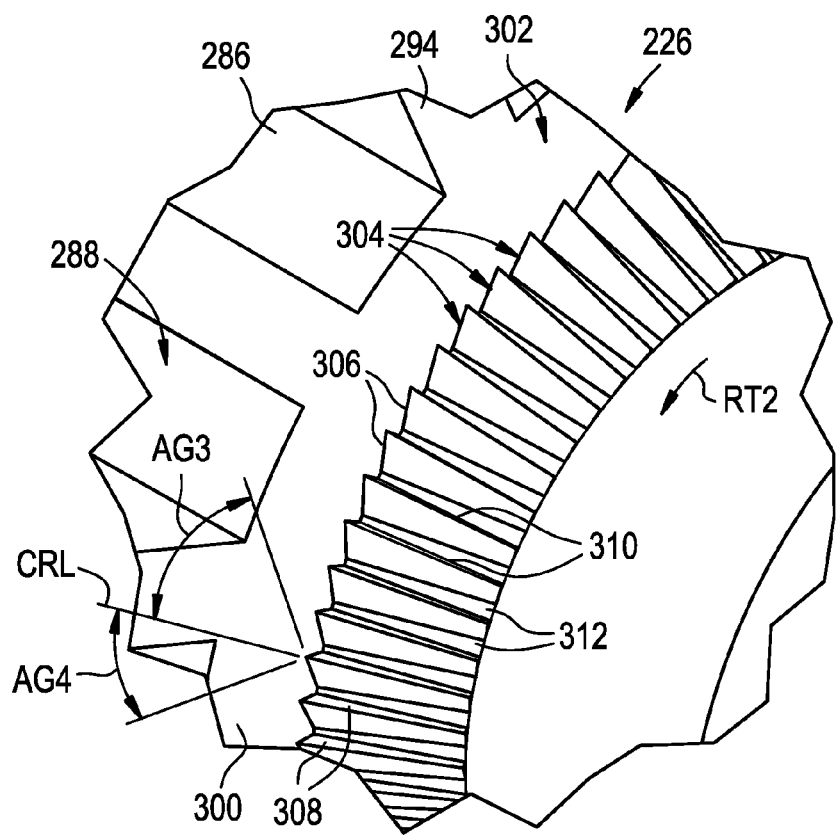
FIG. 8 is a greatly-enlarged view of the portion of the jounce bumper in FIGS. 2-4 and 7 identified as Detail 8 in FIG. 7.

One example of a gas spring assembly 200 is shown in FIGS. 2-4 as having a longitudinally-extending axis AX and can include one or more end members, such as an end member 202 and an end member 204 that is spaced longitudinally from end member 202. A flexible wall 206 can extend peripherally around axis AX and can extend between opposing ends 208 and 210. The ends of the flexible wall can be secured along the end members in a substantially fluid-tight manner such that a spring chamber 212 is at least partially defined within the gas spring assembly.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. In the embodiment shown in FIGS. 2 and 3, for example, end member 202 is secured along a first or upper structural component USC, such as associated vehicle body BDY in FIG. 1, for example, and can be secured thereon in any suitable manner. For example, one or more securement devices, such as mounting studs 214, for example, can be included along end member 202. In some cases, the one or more securement devices (e.g., mounting studs 214) can project outwardly from end member 202 and can be secured thereon in a suitable manner, such as, for example, by way of a flowed-material joint (not shown) or a press-fit connection (not identified). Additionally, such one or more securement devices can extend through mounting holes HLS in upper structural component USC and receive one or more threaded nuts or other securement devices (not shown), for example. As an alternative to one or more of mounting studs 214, one or more threaded passages (e.g., blind passages and/or through passages) could be used in conjunction with a corresponding number of one or more threaded fasteners.

Additionally, a fluid communication port, such as a transfer passage 216 (FIG. 3), for example, can optionally be provided to permit fluid communication with spring chamber 212, such as may be used for transferring pressurized gas into and/or out of the spring chamber, for example. In the exemplary embodiment shown, transfer passage 216 extends through at least one of mounting studs 214 and is in fluid communication with spring chamber 212. It will be appreciated, however, that any other suitable fluid communication arrangement could alternately be used.

End member 204 can be secured along a second or lower structural component LSC, such as an axle AXL in FIG. 1, for example, in any suitable manner. As one example, lower structural component LSC could include one or more mounting holes HLS extending therethrough. In such case, a threaded fastener 218 could extend through one of mounting holes HLS and be operatively connected to end member 204 to at least partially secure the end member on or along the associated structural component.

It will be appreciated that the one or more end members can be of any suitable type, kind, construction and/or configuration, and can be operatively connected or otherwise secured to the flexible wall in any suitable manner. In the exemplary arrangement shown in FIGS. 2 and 3, for example, end member 202 is of a type commonly referred to as a bead plate that can be secured to end 208 of flexible wall 206, such as by way of a crimped-edge connection 220. End member 204 is shown in the exemplary arrangement in FIGS. 2 and 3 as being of a type commonly referred to as a piston (or a roll-off piston) that has an outer side surface 222 that flexible wall 206 abuttingly engages such that a rolling lobe 224 can be formed therealong. As gas spring assembly 200 is displaced between extended and collapsed conditions, rolling lobe 224 can be displaced along outer side surface 222 in a conventional manner.

Gas spring assembly 200 also includes a jounce bumper 226 that is supported on one of the end members, such as end member 204, for example, such that an end member and jounce bumper assembly ASM can be formed thereby, such as is shown in FIGS. 3 and 4, for example. Generally, jounce bumper 226 can be supported within spring chamber 212, such as to inhibit direct contact between end members 202 and 204, for example. With reference to FIGS. 2-6, end member 204 is shown as including a body 228 that extends longitudinally between opposing ends 230 and 232. As identified in FIG. 3, body 228 can include a longitudinally-extending outer side wall 234 that extends peripherally about axis AX and at least partially defines outer side surface 222. An end wall 236 is disposed transverse to axis AX and extends radially-inwardly from a shoulder portion 238 toward a first inner side wall (or wall portion) 240. The first inner side wall can extend longitudinally-outwardly beyond end wall 236 and peripherally about axis AX. Additionally, first inner side wall 240 can have an outer surface 242 that is dimensioned to receive end 210 of flexible wall 206 such that a substantially fluid-tight seal can be formed therebetween. In some cases, a retaining ridge 244 can project radially-outwardly from along the first portion of the inner side wall and can extend peripherally along at least a portion thereof, such as may assist in retaining end 210 of flexible wall 206 in abutting engagement on or along the first inner side wall.

Body 228 can also include a second inner side wall (or wall portion) 246 that extends longitudinally-inwardly into the body from along end wall 236. Second inner side wall 246 is shown as terminating at a bottom wall 248 that is approximately planar and disposed transverse to axis AX such that second inner side wall 246 and bottom wall 248 can at least partially define a cavity 250 within body 228. In some cases, bridge walls 252 can, optionally, extend between and operatively interconnect outer side wall 234 and second inner side wall 246.

An inner support wall 254 can, optionally, be disposed radially inward from outer side wall 234 and can extend peripherally about axis AX. Inner support wall 254 can form a hollow, column-like structure that projects from along bottom wall 248 in a longitudinal direction toward end 232 and can at least partially define a mounting plane MP formed therealong. In this manner, body 228 can be supported at least in part by inner support wall 254, such as on or along an associated structural member (e.g., lower structural component LSC in FIGS. 2 and 3). Additionally, axially applied loads or forces transmitted to bottom wall 248, such as from impacts imparted on jounce bumper 226, for example, can be at least partially reacted or otherwise transferred to the associated mounting structure by the inner support wall.

Additionally, or in the alternative, body 228 can, optionally, include a central wall 256 that can be disposed radially inward from inner support wall 254 and can form a post-like structure that can project from along bottom wall 248 in a direction toward end 232. In some cases, central wall 256 can terminate in approximate alignment with mounting plane MP, such as is illustrated in FIG. 4, for example. End member 204 can optionally include one or more features or components suitable for use in securing the end member on or along an associated structural component. As one example, an insert 258 can be molded into or otherwise captured and retained within central wall 256. The insert can include one or more securement features, such as, for example, one or more helical threads 260 that are dimensioned to receive and cooperatively engage one or more helical threads 262 of threaded fastener 218 for securement of the end member on or along the associate structural component (e.g., lower structural component LSC), such as by passing through hole HLS and a passage 264 extending into central wall 256 from along mounting plane MP, for example.

Body 228 further includes one or more features dimensioned to cooperatively engage jounce bumper 226. It will be appreciated that any suitable configuration and/or arrangement of features could be used. For example, the body could include a projection with one or more external helical threads that are dimensioned to cooperatively engage corresponding one or more internal helical threads on the jounce bumper. As another example, body 228 can include a recess 266 (FIG. 5) that extends from along bottom wall 248 longitudinally-inwardly into the body in a direction toward end 232. In some cases, central wall 256 can include one or more recess wall portions 268 that can at least partially define recess 266. Body 228 can also include one or more helical threads 270 that can be formed into central wall 256 or wall portion 268 thereof (e.g., integrally formed from the material of body 228) or can be otherwise accessible within recess 266, such as from along bottom wall 248, for example. In some cases, a square or trapezoidal thread form (e.g., square threads or Acme threads) having a rectangular, square or trapezoidal cross-sectional shape and including one or more thread starts could be used.

Additionally, body 228 can, optionally, include one or more interengagement features 272 (FIG. 5) that can be cooperative with the jounce bumper, such as to assist in inhibiting inadvertent relative rotation between the jounce bumper and the end member. As one example, such one or more interengagement features 272 can be disposed along at least one of bottom wall 248, central wall 256 and/or helical threads 270 that are suitable for abuttingly engaging jounce bumper 226, such as to provide an anti-counter rotation function and/or to otherwise at least partially inhibit inadvertent disassembly of the end member and jounce bumper assembly ASM.

It will be appreciated that such one or more interengagement features can be of any suitable size, shape, form, configuration and/or arrangement. In the exemplary arrangement shown in FIGS. 3-6, a plurality of serrations or teeth 274 (FIGS. 5 and 6) are shown as being disposed along at least a portion of at least a first turn of helical threads 270. During relative rotation with jounce bumper 226 in a direction represented by arrow RT1, teeth 274 can include a forward surface or face 276 and a rearward surface or face 278, and can extend between a top edge or surface 280 and a bottom edge or surface 282 to define a tooth depth (not identified). In some cases, forward face 276 and rearward face 278 of teeth 274 can extend or be otherwise disposed at different angles relative a common reference line CRL, such as axis AX or another reference feature extending in a longitudinal and/or radial direction. In the arrangement shown in FIG. 6, for example, forward faces 276 are disposed at an angle AG1 relative to line CRL and rearward faces 278 are disposed at an angle AG2 relative to line CRL. It will be appreciated that values for angles AG1 and AG2 can be within any suitable ranges of values. In a preferred arrangement, however, angle AG1 can be greater than angle AG2 such that teeth 274 can function to desirably increase or otherwise improve resistance to inadvertent disassembly of the end member and jounce bumper when in an assembled condition. It will be appreciated, however, that other arrangements could alternately be used.

Jounce bumper 226 is shown in FIGS. 3, 4, 7 and 8 as including an outer side wall 284 and an inner side wall 286 that is disposed radially-inwardly of the outer side wall such that an inner chamber 288 is at least partially defined therebetween. Inner side wall 286 also at least partially defines an inner passage 290 that extends through the jounce bumper. An end wall 292 is disposed transverse to and interconnects the inner and outer side walls. Additionally, one or more connecting walls 294 (FIG. 7) can extend between and operatively interconnect inner and outer side walls 286 and 284 such that the inner chamber can be segmented or otherwise separated into a plurality of inner chambers.

Jounce bumper 226 can also include a mounting post 296 that extends axially outwardly beyond at least outer side wall 284 in a direction away from end wall 292. Additionally, the jounce bumper can include one or more helical threads 298 that, in a preferred arrangement, are cooperatively with helical thread(s) 270 such that jounce bumper 226 can be threadably interengaged with end member 204. It will be appreciated that helical threads 298 can be formed on or along jounce bumper 226 in any suitable manner (e.g., integrally formed from the material of jounce bumper 226), such as by being formed along mounting post 296, for example. In some cases, a square or trapezoidal thread form (e.g., square threads or Acme threads) having a rectangular, square or trapezoidal cross-sectional shape and including one or more thread starts could be used. Additionally, helical thread(s) 270 and 298 can, in some cases, be dimensioned such that an end surface 300 (FIG. 7) of outer side wall 284 can abuttingly engage bottom wall 248 of body 228.

Additionally, jounce bumper 226 can, optionally, include one or more interengagement features 302 that can be cooperative with the end member, such as to assist in inhibiting inadvertent relative rotation between the jounce bumper and the end member. As one example, such one or more interengagement features 302 can be disposed along at least one of outer side wall 284, inner side wall 286, mounting post 296 and/or helical thread(s) 298 and can be suitable for abuttingly engaging end member 204 to inhibit inadvertent disassembly of the gas spring piston and the jounce bumper. In the arrangement shown in FIGS. 3, 4, 7 and 8, a plurality of serrations or teeth 304 (FIG. 8) are shown as being disposed along at least a portion of mounting post 296 and/or end surface 300.

During relative rotation with end member 204 in a direction represented by arrow RT2, teeth 304 can include a forward surface or face 306 and a rearward surface or face 308, and can extend between a top edge or surface 310 and a bottom edge or surface 312 to define a tooth depth (not identified). In some cases, forward face 306 and rearward face 308 of teeth 304 can extend or be otherwise disposed at different angles relative a common reference line CRL, such as axis AX or another reference feature extending in a longitudinal and/or radial direction. In the arrangement shown in FIG. 8, for example, forward faces 306 are disposed at an angle AG3 relative to line CRL and rearward faces 308 are disposed at an angle AG4 relative to line CRL. It will be appreciated that values for angles AG1 and AG2 can be within any suitable ranges of values. In a preferred arrangement, however, angle AG1 can be greater than angle AG2 such that teeth 304 can function to desirably increase or otherwise improve resistance to inadvertent disassembly of the end member and jounce bumper when in an assembled condition. It will be appreciated, however, that other arrangements could alternately be used.

In general, at least one of the end member and the jounce bumper will include one or more interengagement features (e.g., interengagement features 272 and/or 302. And, in a preferred arrangement, both of the gas spring piston and the jounce bumper will include one or more of such features. In such cases, one or more surfaces or faces of teeth 274 can be biased or otherwise disposed at an angle that is cooperatively with one or more surfaces or faces of teeth 304 such that a self-locking arrangement can be formed therebetween. It will be appreciated, however, that other arrangements could alternately be used.

A height or distance sensing device 314 is, optionally, shown in FIGS. 2 and 3 as being disposed within spring chamber 212 along end member 202 and being secured thereto using suitable fasteners 316. Height sensing device 314 can be of any suitable type, kind and/or construction, such as an ultrasonic sensor that transmits and receives ultrasonic waves WVS (FIG. 3), for example. Additionally, it will be appreciated that height sensing device 314 can be connected to other systems and/or components of a vehicle suspension system in any suitable manner. As shown in FIGS. 2 and 3, height sensing device 314 includes a lead or connection 318 that can be used for such communication purposes, such as is indicated by leads 126 of control system 120 in FIG. 1, for example.

It will be recognized and appreciated that an end member and jounce bumper assembly in accordance with the subject matter of the present disclosure, such as assembly ASM, for example, is suitable for use in forming a gas spring assembly of any suitable type, kind, configuration and/or arrangement, such as, for example, have been shown and described herein as gas spring assemblies 102 and/or 200. It will also be recognized and appreciated that a gas spring assembly that includes an end member and jounce bumper assembly in accordance with the subject matter of the present disclosure, such as assembly ASM, for example, can be used in connection with a suspension system, such as suspension system 100, for example. It will be further recognized and appreciated that an end member and/or a jounce bumper in accordance with the subject matter of the present disclosure, such as end member 204 and/or jounce bumper 226, for example, alone or in combination, can be components parts of a gas spring assembly, a kit and/or used in connection with a method, such as a method of assembling a gas spring assembly, for example. It is to be understood that the subject matter of the present disclosure is intended to encompass any and all combinations of the different features, components, assemblies and/or systems that are shown and described herein, and, without limitation, that any suitable arrangement of features, components, assemblies and/or systems, in any combination, can be used.

It will be appreciated that an end member and/or a jounce bumper in accordance with the subject matter of the present disclosure can be formed or otherwise manufactured from any suitable material or combination of materials. In a preferred arrangement, however, end member 204 and jounce bumper 226 can be formed from a non-metallic material, such as a thermoplastic or thermoset material, for example. Examples of suitable non-metallic materials from which either or both of end member 204 and/or jounce bumper 226 can be formed include thermoplastic materials, such as glass or other fiber-reinforced polypropylene, glass or other fiber-reinforced polyamide, as well as high-strength (e.g., unfilled) polyester, polyethylene, polypropylene or other polyether-based materials, or any combination thereof.

One example of a method 400 of assembling a gas spring assembly in accordance with the subject matter of the present disclosure is shown in FIG. 9. Method 400 can include providing an end member (e.g., end member 204) including at least one of: a) one or more interconnecting features (e.g., one or more helical threads 270); and b) one or more interengaging features (e.g., one or more teeth 274), as is represented by item number 402. Method 400 can also include providing a jounce bumper (e.g. jounce bumper 226) including at least one of: a) one or more interconnecting features (e.g., one or more helical threads 298); and b) one or more interengaging features (e.g., one or more teeth 304), as is represented by item number 404. Method 400 can also include securing the jounce bumper to the end member using the interconnecting features thereof such that the interengaging features are operatively engaged with one another, as is represented by item number 406. In this manner, anti-counter rotation functions and/or resistance to inadvertent disassembly between the jounce bumper and the end member can be achieved.

As illustrated in FIG. 9, method 400 can further include providing a flexible wall (e.g., flexible wall 206) and securing one end of the flexible wall to the end member (e.g. end member 204), as is represented by item numbers 408 and 410, respectively. Method 400 can also include providing an additional end member (e.g. end member 202) and securing another and of the flexible wall to the additional end member, as are represented by item numbers 412 and 414, respectively.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood that claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An end member and jounce bumper assembly comprising:
   an end member at least partially formed from a quantity of polymeric material and including a base wall and at least one helical thread integrally formed from said quantity of polymeric material; and,
   a jounce bumper including a mounting wall and at least one helical thread complimentary to said at least one helical thread of said end member, said at least one helical thread of said jounce bumper dimensioned to threadably engage said at least one helical thread of said end member such that said mounting wall of said jounce bumper can abuttingly engage said base wall of said end member;
   said jounce bumper being rotatable in a first direction in which said at least one helical thread of said end member and said at least one helical thread of said jounce bumper are advanced into engagement with one another and said jounce bumper being rotatable in a second direction in which said at least one helical thread of said end member and said at least one helical thread of said jounce bumper are withdrawn from engagement with one another; and,
   at least one of said end member and said jounce bumper including an interengagement feature operative to inhibit rotation of said jounce bumper in said second direction relative to said end member.

2. An end member and jounce bumper assembly according to claim 1, wherein said jounce bumper is at least partially formed from a second quantity of polymeric material and said at least one helical thread of said jounce bumper is formed from said second quantity of polymeric material.

3. An end member and jounce bumper assembly according to claim 1, wherein said interengagement feature is disposed along at least one of said base wall and said at least one helical thread of said end member.

4. An end member and jounce bumper assembly according to claim 1, wherein said interengagement feature is disposed along at least one of said mounting wall and said at least one helical thread of said jounce bumper.

5. An end member and jounce bumper assembly according to claim 1, wherein said end member includes a first interengagement feature disposed along at least one of said base wall and said at least one helical thread, and said jounce bumper includes a second interengagement feature disposed along at least one of said mounting wall and said at least one helical thread, and said first and second interengagement features are complementary to one another.

6. An end member and jounce bumper assembly according to claim 1, wherein said end member includes one of a projection and a recess with said at least one helical thread of said end member formed therealong.

7. An end member and jounce bumper assembly according to claim 6, wherein said jounce bumper includes the other of said projection and said recess with said at least one helical thread of said jounce bumper extending therealong.

8. An end member and jounce bumper assembly according to claim 7, wherein said end member includes a wall portion at least partially defining said recess, and said jounce bumper includes a wall portion at least partially defining said projection.

9. An end member and jounce bumper assembly according to claim 1, wherein said interengagement feature includes a plurality of teeth disposed in spaced relation to one another.

10. An end member and jounce bumper assembly according to claim 9, wherein said end member includes an axis and a first plurality of teeth disposed in spaced relation to one another about said axis, and said jounce bumper includes a second plurality of teeth disposed in spaced relation to one another and cooperative with said first plurality of teeth such that at least one of said second plurality of teeth abuttingly interengages at least one of said first plurality of teeth in an assembled condition.

11. An end member and jounce bumper assembly according to claim 9, wherein said plurality of teeth each include a forward face engageable in said first direction of rotation and a rearward face engageable in said second direction of rotation.

12. An end member and jounce bumper assembly according to claim 11, wherein said forward face of each of said plurality of teeth is disposed at a first angle relative to a reference line and said rearward face of each of said plurality of teeth is disposed at a second angle relative to said reference line with said first angle being greater than said second angle.

13. A gas spring assembly comprising:
   a first end member;
   a second end member at least partially formed from a quantity of polymeric material and including a base wall and at least one helical thread integrally formed from said quantity of polymeric material;
   a flexible wall secured between said first end member and said second end member in a substantially fluid-tight manner such that a spring chamber is at least partially defined therebetween; and,
   a jounce bumper disposed within said spring chamber and operatively connected to said second end member, said jounce bumper including a mounting wall and at least one helical thread complimentary to said at least one helical thread of said second end member, said at least one helical thread of said jounce bumper dimensioned to threadably engage said at least one helical thread of said second end member such that said mounting wall of said jounce bumper can abuttingly engage said base wall of said second end member.

14. A gas spring assembly according to claim 13, wherein said jounce bumper is at least partially formed from a second quantity of polymeric material and said at least one helical thread is integrally formed from said second quantity of polymeric material.

15. A gas spring assembly according to claim 13, wherein said jounce bumper is rotatable in a first direction in which said at least one helical thread of said second end member and said at least one helical thread of said jounce bumper advance into engagement with one another and said jounce bumper is rotatable in a second direction in which said at least one helical thread of said second end member and said at least one helical thread of said jounce bumper withdraw from engagement with one another; and,
   at least one of said second end member and said jounce bumper includes an interengagement feature operative to inhibit rotation of said jounce bumper in said second direction relative to said second end member.

16. A gas spring assembly according to claim 15, wherein said second end member includes a first interengagement feature disposed along at least one of said base wall and said at least one helical thread, and said jounce bumper includes a second interengagement feature disposed along at least one of said mounting wall and said at least one helical thread, and said first interengagement feature and said second interengagement feature are complementary to one another.

17. A gas spring assembly according to claim 16, wherein at least one of said first interengagement feature and said second interengagement feature includes a plurality of teeth having a forward face engageable in said first direction of rotation and a rearward face engageable in said second direction of rotation.

18. A method of assembling a gas spring assembly, said method comprising:
   providing an end member at least partially formed from a quantity of polymeric material and including a base wall and at least one helical thread integrally formed from said quantity of polymeric material;
   providing a jounce bumper including a mounting wall and at least one helical thread complimentary to said at least one helical thread of said end member such that said jounce bumper is rotatable in a first direction in which said at least one helical thread of said end member and said at least one helical thread of said jounce bumper are advanced into engagement with one another and said jounce bumper is rotatable in a second direction in which said at least one helical thread of said end member and said at least one helical thread of said jounce bumper are withdrawn from engagement with one another;
   providing an interengagement feature on at least one of said end member and said jounce bumper; and,
   securing said jounce bumper and said end member by interengaging said at least one helical thread of said end member and said at least one helical thread of said jounce bumper and rotating said jounce bumper in said first direction such that said mounting wall of said jounce bumper abuttingly engages said base wall of said end member and said interengagement feature inhibits rotation of said jounce bumper in said second direction relative to said end member.

19. A method of assembling a gas spring assembly, said method comprising:
   providing an end member at least partially formed from a quantity of polymeric material and including a base wall, at least one helical thread integrally formed from said quantity of polymeric material and a first interengagement feature disposed along at least one of said base wall and said at least one helical thread with said first interengagement feature including a plurality of teeth;
   providing a jounce bumper including a mounting wall, at least one helical thread complimentary to said at least one helical thread of said end member and a second interengagement feature disposed along at least one of said mounting wall and said at least one helical thread of said jounce bumper with said second interengagement feature including a plurality of teeth; and,
   securing said jounce bumper and said end member by interengaging said at least one helical thread of said end member and said at least one helical thread of said jounce bumper such that said mounting wall of said jounce bumper abuttingly engages said base wall of said end member by rotating said jounce bumper and said end member relative to one another in a first direction such that at least one of said plurality of teeth of said second interengagement feature abuttingly engages at least one of said plurality of teeth of said first interengagement feature to thereby inhibit rotation of said jounce bumper and said end member relative to one another in a second direction opposite said first direction.

20. A method according to claim 18, said providing of said jounce bumper includes providing a jounce bumper that is at least partially formed from a second quantity of polymeric material with said at least one helical thread of said jounce bumper integrally formed from said second quantity of polymeric material.

* * * * *